US010836398B2

(12) United States Patent
Leekin et al.

(10) Patent No.: US 10,836,398 B2
(45) Date of Patent: Nov. 17, 2020

(54) VEHICULAR NAVIGATIONAL CONTROL

(71) Applicant: INTERNATIONAL BUSINESS MACHINES CORPORATION, Armonk, NY (US)

(72) Inventors: Rachel Leekin, White Plains, NY (US); Pramod Verma, Fairfax, VA (US); Kuntal Dey, New Delhi (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/018,124

(22) Filed: Jun. 26, 2018

(65) Prior Publication Data
US 2019/0389471 A1    Dec. 26, 2019

(51) Int. Cl.
| | |
|---|---|
| *B60W 40/04* | (2006.01) |
| *B60W 30/18* | (2012.01) |
| *G08G 1/097* | (2006.01) |
| *G08G 1/0967* | (2006.01) |
| *G06K 9/00* | (2006.01) |
| *G05D 1/00* | (2006.01) |

(52) U.S. Cl.
CPC .......... *B60W 40/04* (2013.01); *B60W 30/181* (2013.01); *G05D 1/0088* (2013.01); *G06K 9/00825* (2013.01); *G08G 1/097* (2013.01); *G08G 1/096725* (2013.01); *G08G 1/096783* (2013.01); *B60W 2555/60* (2020.02); *G05D 2201/0213* (2013.01)

(58) Field of Classification Search
CPC ............... B60W 40/04; B60W 30/181; B60W 2555/60; G08G 1/096725; G08G 1/096783; G08G 1/097; G05D 1/0088; G05D 2201/0213; G06K 9/00825; G01C 21/3461

See application file for complete search history.

(56) References Cited

U.S. PATENT DOCUMENTS

| | | |
|---|---|---|
| 5,428,544 A | 6/1995 | Shyu |
| 9,008,952 B2 | 4/2015 | Caskey et al. |
| 9,691,278 B2 | 6/2017 | Poornachandran et al. |

(Continued)

FOREIGN PATENT DOCUMENTS

| | | |
|---|---|---|
| JP | 2013130555 | 7/2013 |
| JP | 2014056483 | 3/2014 |
| JP | 2016031707 | 3/2016 |

*Primary Examiner* — Aniss Chad
*Assistant Examiner* — Chase L Cooley
(74) *Attorney, Agent, or Firm* — Schmeiser, Olsen & Watts; Nicholas L. Cadmus

(57) ABSTRACT

A method and system for enabling an automated vehicular navigational improvement is provided. The method includes monitoring traffic control devices located within a specified perimeter surrounding a vehicle and traffic control devices. Traffic control device data defining operational characteristics of the traffic control devices is retrieved and a distance between the vehicle a traffic control device is determined. Status data indicating a control status of the traffic control device and data defining distances and associated travel speeds of additional vehicles located within said perimeter are retrieved and analyzed. A predicted arrival time of the vehicle and predicted control status the traffic control device is determined and a resulting control command alert associated with driving functions of the vehicle.

18 Claims, 6 Drawing Sheets

(56) References Cited

U.S. PATENT DOCUMENTS

| 9,761,131 | B2 | 9/2017 | Robinson |
| 9,761,136 | B2 | 9/2017 | Tonguz et al. |
| 2002/0082768 | A1 | 6/2002 | Binnig |
| 2005/0187701 | A1 | 8/2005 | Baney |
| 2011/0095908 | A1* | 4/2011 | Nadeem ................... B60H 3/00 340/905 |
| 2016/0098924 | A1 | 4/2016 | Vahidi et al. |
| 2016/0196743 | A1 | 7/2016 | Garcia |
| 2017/0124869 | A1* | 5/2017 | Popple ............. G08G 1/096725 |
| 2017/0341643 | A1 | 11/2017 | Gutmann et al. |
| 2018/0063487 | A1* | 3/2018 | Gage ................ G08G 1/096716 |
| 2018/0162409 | A1* | 6/2018 | Altmannshofer ........................... G08G 1/096716 |
| 2019/0251838 | A1* | 8/2019 | Bernhardt .......... G01C 21/3415 |

* cited by examiner

VEHICULAR NAVIGATIONAL CONTROL

FIELD

The present invention relates generally to a method for automatically directing a vehicle and in particular to a method and associated system for determining a status of a traffic control device and redirecting a vehicle in accordance with the determined status of the traffic control device.

BACKGROUND

Determining conditions for vehicular travel typically includes an inaccurate process with little flexibility. Addressing specific vehicular travel issues may involve an unreliable process that may be time consuming and require a large amount of resources. Accordingly, there exists a need in the art to overcome at least some of the deficiencies and limitations described herein above.

SUMMARY

A first aspect of the invention provides an automated vehicular navigational improvement method comprising: continuously monitoring, by a processor of a hardware device within a first vehicle in motion, traffic control devices located within a specified perimeter surrounding the first vehicle and the traffic control devices; retrieving, by the processor from a remote database, traffic control device data defining operational characteristics of the traffic control devices; determining, by the processor, a first distance between the first vehicle and a first traffic control device of the traffic control devices; retrieving, by the processor from the first traffic control device, status data indicating a current control status of the first traffic control device; retrieving, by the processor, distances and associated travel speeds of a plurality of vehicles located within the perimeter; analyzing, by the processor, results of: the continuously monitoring, the current control status, the traffic control device data, the first distance, and the distances and associated travel speeds; determining, by the processor based on a current speed of travel of the first vehicle and the first distance of the first vehicle from the first traffic control device, a predicted arrival time of the first vehicle with respect to the first traffic control device; determining, by the processor based on results of the analyzing, a predicted control status of the first traffic control device at the predicted arrival time; and issuing, by the processor to a driver of the first vehicle based on the predicted control status, a control command alert associated with driving functions of the first vehicle.

A second aspect of the invention provides computer program product, comprising a computer readable hardware storage device storing a computer readable program code, the computer readable program code comprising an algorithm that when executed by a computer processor of a hardware device, within a first vehicle in motion, implements an automated vehicular navigational improvement method, the method comprising: continuously monitoring, by the processor, traffic control devices located within a specified perimeter surrounding the first vehicle and the traffic control devices; retrieving, by the processor from a remote database, traffic control device data defining operational characteristics of the traffic control devices; determining, by the processor, a first distance between the first vehicle and a first traffic control device of the traffic control devices; retrieving, by the processor from the first traffic control device, status data indicating a current control status of the first traffic control device; retrieving, by the processor, distances and associated travel speeds of a plurality of vehicles located within the perimeter; analyzing, by the processor, results of: the continuously monitoring, the current control status, the traffic control device data, the first distance, and the distances and associated travel speeds; determining, by the processor based on a current speed of travel of the first vehicle and the first distance of the first vehicle from the first traffic control device, a predicted arrival time of the first vehicle with respect to the first traffic control device; determining, by the processor based on results of the analyzing, a predicted control status of the first traffic control device at the predicted arrival time; and issuing, by the processor to a driver of the first vehicle based on the predicted control status, a control command alert associated with driving functions of the first vehicle.

A third aspect of the invention provides a hardware device, within a first vehicle in motion, comprising a computer processor coupled to a computer-readable memory unit, the memory unit comprising instructions that when executed by the computer processor implements an automated vehicular mode switching improvement method comprising: continuously monitoring, by the processor, traffic control devices located within a specified perimeter surrounding the first vehicle and the traffic control devices; retrieving, by the processor from a remote database, traffic control device data defining operational characteristics of the traffic control devices; determining, by the processor, a first distance between the first vehicle and a first traffic control device of the traffic control devices; retrieving, by the processor from the first traffic control device, status data indicating a current control status of the first traffic control device; retrieving, by the processor, distances and associated travel speeds of a plurality of vehicles located within the perimeter; analyzing, by the processor, results of: the continuously monitoring, the current control status, the traffic control device data, the first distance, and the distances and associated travel speeds; determining, by the processor based on a current speed of travel of the first vehicle and the first distance of the first vehicle from the first traffic control device, a predicted arrival time of the first vehicle with respect to the first traffic control device; determining, by the processor based on results of the analyzing, a predicted control status of the first traffic control device at the predicted arrival time; and issuing, by the processor to a driver of the first vehicle based on the predicted control status, a control command alert associated with driving functions of the first vehicle.

The present invention advantageously provides a simple method and associated system capable of determining conditions for vehicular travel.

DETAILED DESCRIPTION

Figure 1:
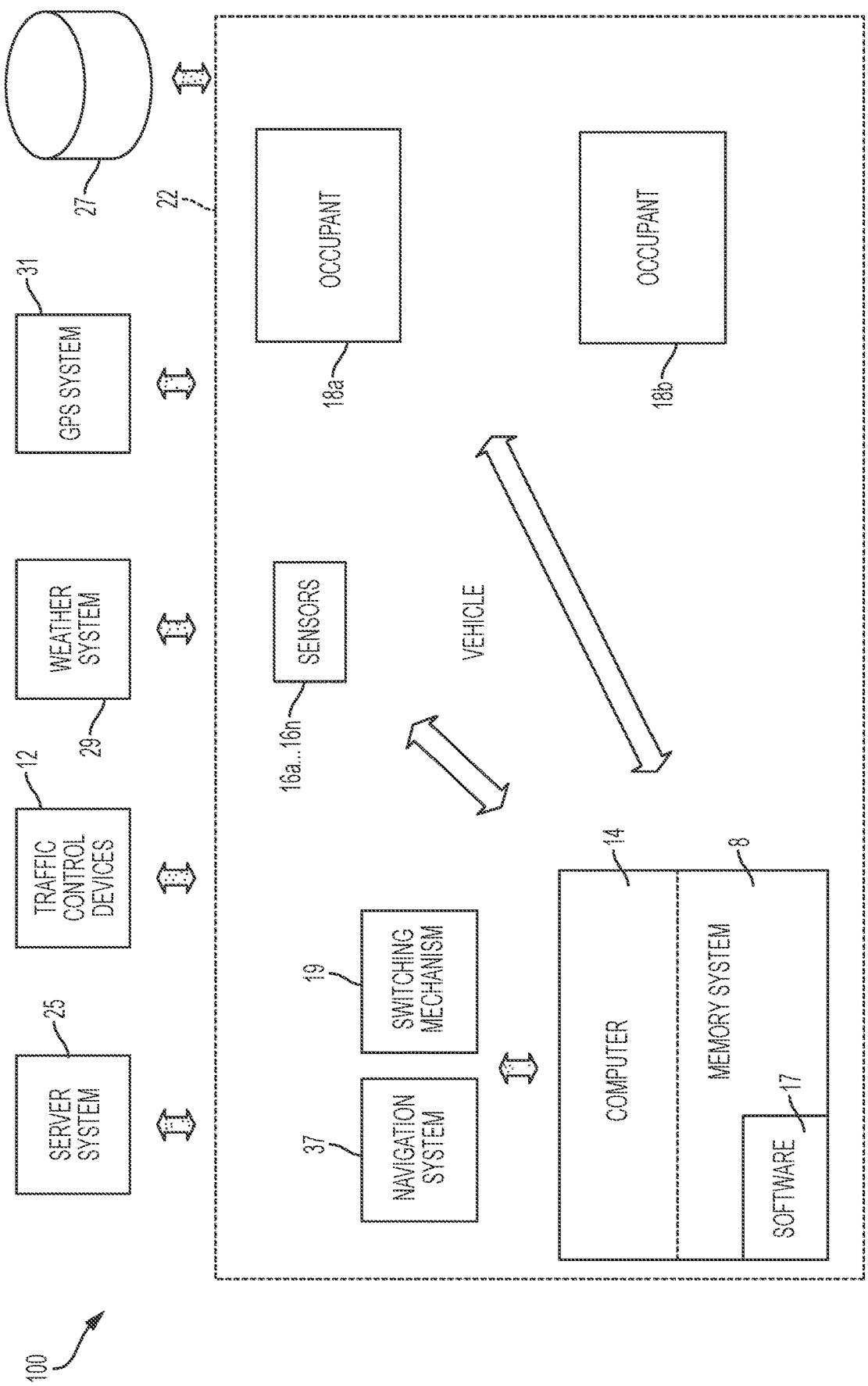
FIG. 1 illustrates a system for improving traffic control device technology by determining a status of traffic control devices and redirecting a vehicle based on a determined status of the traffic control devices, in accordance with embodiments of the present invention.

FIG. 1 illustrates a system 100 for improving traffic control device technology by determining a status of traffic control devices 12 and redirecting a vehicle 22 based on a determined status of the traffic control devices 12, in accordance with embodiments of the present invention. System 100 is enabled to execute a process for automatically directing a vehicle 22 and switching between autonomous and manual operation of vehicle 22 based: on predicted traffic control device statuses, weather conditions, and historic driving records for operation of traffic control devices 12. Traffic control devices 12 may include any type of device for controlling or directing a flow of vehicular traffic including, inter alia, a traffic light, a railroad crossing warning system, a construction zone warning, etc. Operation of traffic control devices 12 may be affected by, inter alia, hardware system failure, software system failure, inclement weather conditions, power system failure, law enforcement issues, etc.

System 100 enables a process for enabling a navigation system 37 in vehicle 22 to direct and control traffic flow (with respect to vehicle 22 and additional vehicles traveling within or towards a same location) when traffic control devices (e.g., traffic lights) malfunction. For example, when a traffic light is unexpectedly disabled (e.g., due to a power outage or mechanical failure), vehicle and pedestrian accidents may be likely. The malfunctioning traffic light may cause confusion, delays, and frustration for commuters traveling in vehicles. Vehicular delays during peak travel hours may become very stressful and may cause: financial loss, loss in employee productively, environmental pollution, natural resource waste (e.g., gasoline), and emergency vehicle delay. Therefore system 100 provide a solution for usage of a navigation system 37 for automatically preventing and resolving traffic control device downtime without human intervention.

System 100 enables a traffic control process when a traffic light is malfunctioning such that a server system 25 communicatively connected to vehicles (e.g., vehicle 22) is configured to store and update traffic signal patterns and provide a traffic control system for each of the vehicles. The traffic control system is conjured to request a status of traffic lights located within a predetermined radius of the vehicles. In response, a status from the traffic light is received by the vehicles and a traffic light status is determined with respect to a predicted time of arrival (of the vehicle) at the traffic light. Additionally, a warning is generated and presented to drivers of the vehicles. The warning comprises information warning the drivers of the vehicles to slow down, stop, or maintain speed as the vehicles approach the traffic light. Additionally, the vehicle may be autonomously controlled for automatically slowing or stopping the vehicles based on the warning.

System 100 of FIG. 1 includes a server system 25, traffic control devices 12, a weather sensing system 29, a global positioning satellite (GPS) (or any type of movement detection system) system 31, and a database 27 (comprising traffic control device data) communicatively connected (e.g., via a network) to a vehicle 22. The vehicle 22 includes an onboard computer 14, a switching mechanism 19, sensors 16a . . . 16n, a navigation system 37, and occupants 18a and 18b. Onboard computer 14 and navigation system 37 may include any type of computing system(s) including, inter alia, an automobile integrated controller computer, a computer (PC), a laptop computer, a tablet, etc. Onboard computer 14 includes a memory system 8. Memory system 8 stores program instructions 17 for enabling a process for determining a status of traffic control devices and redirecting a vehicle(s) based on a determined status of the traffic control devices. Onboard computer 14, navigation system 37, and server system 25 may each comprise a specialized hardware device comprising specialized (non-generic) hardware and circuitry (i.e., specialized discrete non-generic analog, digital, and logic based circuitry) for executing a process described with respect to FIGS. 1-5. The specialized discrete non-generic analog, digital, and logic based circuitry may include proprietary specially designed components (e.g., a specialized integrated circuit, such as for example an Application Specific Integrated Circuit (ASIC) designed for only implementing a process for determining a status of traffic control devices and redirecting a vehicle(s) based on a determined status of the traffic control devices). Switching mechanism 19 comprises any type of electrical and/or mechanical switching mechanism (for automatically switching between autonomous and non-autonomous driving modes) that may include proprietary specially designed electro/mechanical components (e.g., circuitry, switching relay, etc.). Sensors 16a . . . 16n may include any type of sensors for detecting road conditions, weather conditions, additional adjacent vehicles, GPS coordinates, etc. Sensors 16a . . . 16n may include, inter alia, optical sensors, temperature sensors, infrared sensors, speed sensors, GPS sensors, moisture sensors, pressure sensors, motion detector sensors, etc.

Vehicle 22 movement detection may include any type of movement detection methods (via usage of sensors 16a . . . 16n) including, inter alia, global positioning satellite (GPS) tracking/movement detection methods (including triangulation motion detection methods), micro electro-mechanical system (MEMS) methods, Wi-Fi positioning methods, a cellular tower triangulation process, etc.

MEMS methods are enabled to detect acceleration movement (i.e., via an accelerometer and a gyroscope) used to trigger requests for positioning information. Therefore, MEMS enables a process for periodically requesting a current location and comparing the current location to prior location requests thereby determining movement, direction, and speed.

A Wi-Fi positioning method comprises a localization technique (used for positioning with wireless access points) based on a process for measuring an intensity of a received signal (i.e., received signal strength in English RSS) and a process comprising finger printing. An accuracy of a Wi-Fi positioning method depends on a number of positions entered into a database.

A GPS tracking method (i.e., comprising a triangulation of geo synchronous satellites) comprises a location based service.

A cellular tower triangulation process uses a location area code (LAC) and a Cell ID of an associated cell tower currently connected to an associated cellular telephone to determine a position of the currently connected cellular telephone resulting in data usage from at least three cellular towers. The cellular tower triangulation process calculates a handset's location precisely. Each base station covers a specified geographical area.

The following description is associated with a process flow enabled by system 100:

System 100 enables a local or state government central server such that traffic patterns are stored and updated. The server may be regularly updated wirelessly via communication with passing vehicles. Additionally, drivers may automatically or manually update traffic control systems within associated vehicles. All vehicles are enabled to request a status of traffic lights within a specified radius (e.g., a 0.5-mile radius). In response, the traffic lights receive a status request and if an associated traffic light is malfunctioning, a vehicle's navigation system requests control of the vehicle. The traffic lights may transmit a corresponding color status back to requesting vehicles and the vehicles use this data to calculate a vehicle distance, speed, and traffic light time period between a changing light status. Additionally, speed related data may be retrieved from additional vehicles. The vehicle distance, speed, and traffic light time period may be used to notify drivers or navigation systems with a predicted traffic lights status. For example, the navigation system may be enabled to warn a driver to slow down, prepare to stop, or continue with a current speed.

If a traffic light outage is longer than a couple of hours or if there is a major natural disaster, the government central server may take over and control traffic via vehicle navigation systems.

Figure 2:
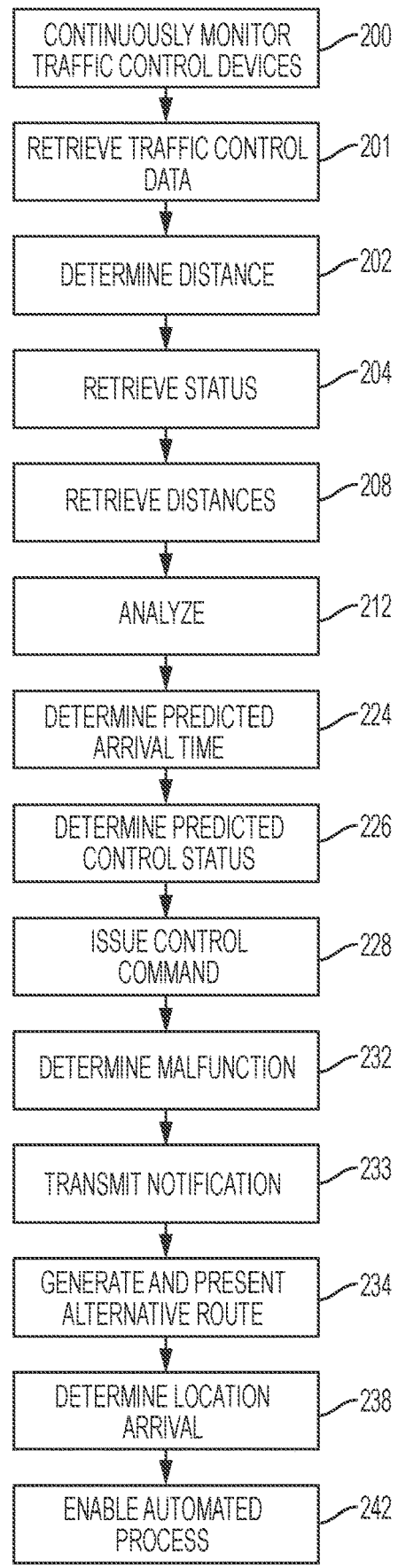
FIG. 2 illustrates a flowchart detailing a process enabled by the system of FIG. 1 for improving traffic control device technology by determining a status of traffic control devices and redirecting a vehicle based on a determined status of the traffic control devices, in accordance with embodiments of the present invention.

FIG. 2 illustrates a flowchart detailing a process enabled by system 100 of FIG. 1 for improving traffic control device technology by determining a status of traffic control devices and redirecting a vehicle based on a determined status of the traffic control devices, in accordance with embodiments of the present invention. Each of the steps in the algorithm of FIG. 2 may be enabled and executed in any order by a computer processor executing computer code. In step 200, traffic control devices located within a specified perimeter surrounding a vehicle in motion and the traffic control devices are continuously monitored (by a hardware device within the vehicle). The monitoring process may include transmitting a status request to the traffic control devices and in response, current operational statuses of the traffic control devices are received. In step 201, traffic control device data defining operational characteristics of the traffic control devices is retrieved from a remote database. In step 202, a distance between the vehicle and a traffic control device (of the traffic control devices) is determined. In step 204, status data is retrieved from the traffic control device. The status data indicates a current control status of the traffic control device. In step 208, distances and associated travel speeds of additional vehicles located within the perimeter are retrieved from the additional vehicles. In step 212, results of steps 200-208 are analyzed. In step 224, a predicted arrival time of the vehicle with respect to arriving at the traffic control device is determined based on a current speed of travel of the vehicle and the distance of the vehicle from the traffic control device. In step 226, a predicted control status of the traffic control device at the predicted arrival time is determined based on results of the analysis of step 212. In step 228, a control command alert associated with driving functions of the vehicle is issued to a driver of the vehicle based on the predicted control status. In step 232, it is determined (based on said current operational statuses of the traffic control devices) that at least one traffic control device is malfunctioning. In step 234, a notification indicating that the traffic control device is malfunctioning is transmitted to a traffic enforcement agency for enabling an associated corrective action. In step 234, an alternative route of travel for redirecting the vehicle from traveling towards the at least one traffic control device is generated and presented (based on the determined malfunction of step 232) to the driver of the vehicle. In step 238, it is determined (based on detected GPS coordinates of the vehicle) that the vehicle has arrived at a location of the traffic control device. In step 242, a resulting automated process is executed. The automated process may include: automatically deploying (by the vehicle control system in response to step 238) a braking system of the vehicle and/or automatically decreasing (by the vehicle control system in response to step 238) a speed of the vehicle. Alternatively (in response to step 238), additional vehicles traveling adjacent to the vehicle may be detected via sensors (e.g., optical sensors, temperature sensors, infrared sensors, speed sensors, GPS sensors, moisture sensors, pressure sensors, motion detector sensors, etc.) of the vehicle and resulting control command alerts associated with driving functions of additional vehicles may be generated and transmitted to the additional vehicles. Additionally, a second alternative automated process may include: detecting additional vehicles traveling towards the vehicle; determining an imminent impact event associated with the vehicle and additional vehicles; and automatically deploying a braking system of the vehicle.

Figure 3:
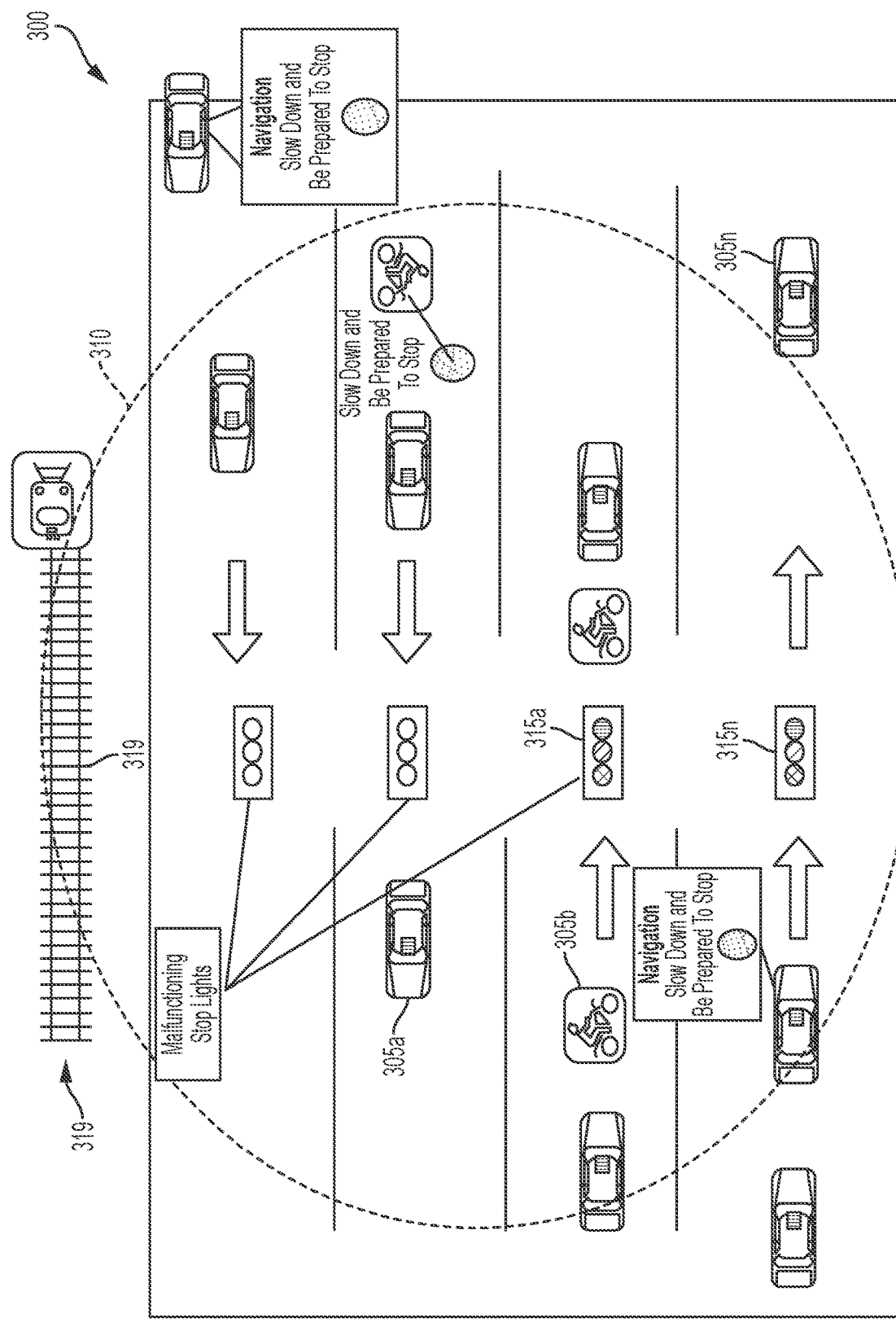
FIG. 3 illustrates an architectural view enabled by the system of FIG. 1 for improving traffic control device technology by determining a status of traffic control devices and redirecting a vehicle based on a determined status of the traffic control devices, in accordance with embodiments of the present invention.

FIG. 3 illustrates an architectural view 300 enabled by system 100 of FIG. 1 for improving traffic control device technology by determining a status of traffic control devices and redirecting a vehicle based on a determined status of the traffic control devices, in accordance with embodiments of the present invention. Architectural view 300 illustrates vehicles 305*a* . . . 305*n* entering a specified radius 310 (i.e., a specified perimeter) from the traffic lights 315*a* . . . 315*n* or railroad crossing 319. Each vehicle navigation or computer system (in each of vehicles 305*a* . . . 305*n*) links (to each other and a traffic control system (e.g., server system 25 of FIG. 1)) and transmits a status request associated with a status of traffic lights 315*a* . . . 315*n* or railroad crossing 319. In response, the traffic control system responds to the requests and provides guidance to vehicles 305*a* . . . 305*n* (in real time) regardless of a functionality of traffic lights 315*a* . . . 315*n* or railroad crossing 319. For Example, if a traffic light is determined to be functionally enabled, vehicles 305*a* . . . 305*n* are directed to proceed as normal and are notified of a status/color of traffic lights 315*a* . . . 315*n*. Additionally, the traffic control system may recommend that an associated vehicle (of vehicles 305*a* . . . 305*n*) should slow down or continue with a current speed based on a location, distance, and speed of the associated vehicle. If the traffic light is determined to be non-functional or disabled, the associated vehicle (linked to a navigation system) may receive real time information associated with directing the associated vehicle towards a functional traffic light. Additionally, the associated vehicle may be directed to proceed based on a vehicle speed, distance, and positioning of additional vehicles.

System 100 may further instruct (via the navigation system) a driver of the associated vehicle to proceed with specified actions. The specified actions may include: stop actions, prepare to stop actions, maintain current speed actions, proceed with caution/slow down actions, etc. The aforementioned functions and interactions may additionally be configured to direct an autonomous vehicle to execute automated actions as described, supra. Similar actions may be implemented with respect to a rail road crossing such that a train is equipped with associated components may interact with a rail road crossing signal as the train enters the specified radius 310. A linking range of all systems with the central system is defined by the strength of radio waves or satellite signal linking.

Figure 4:
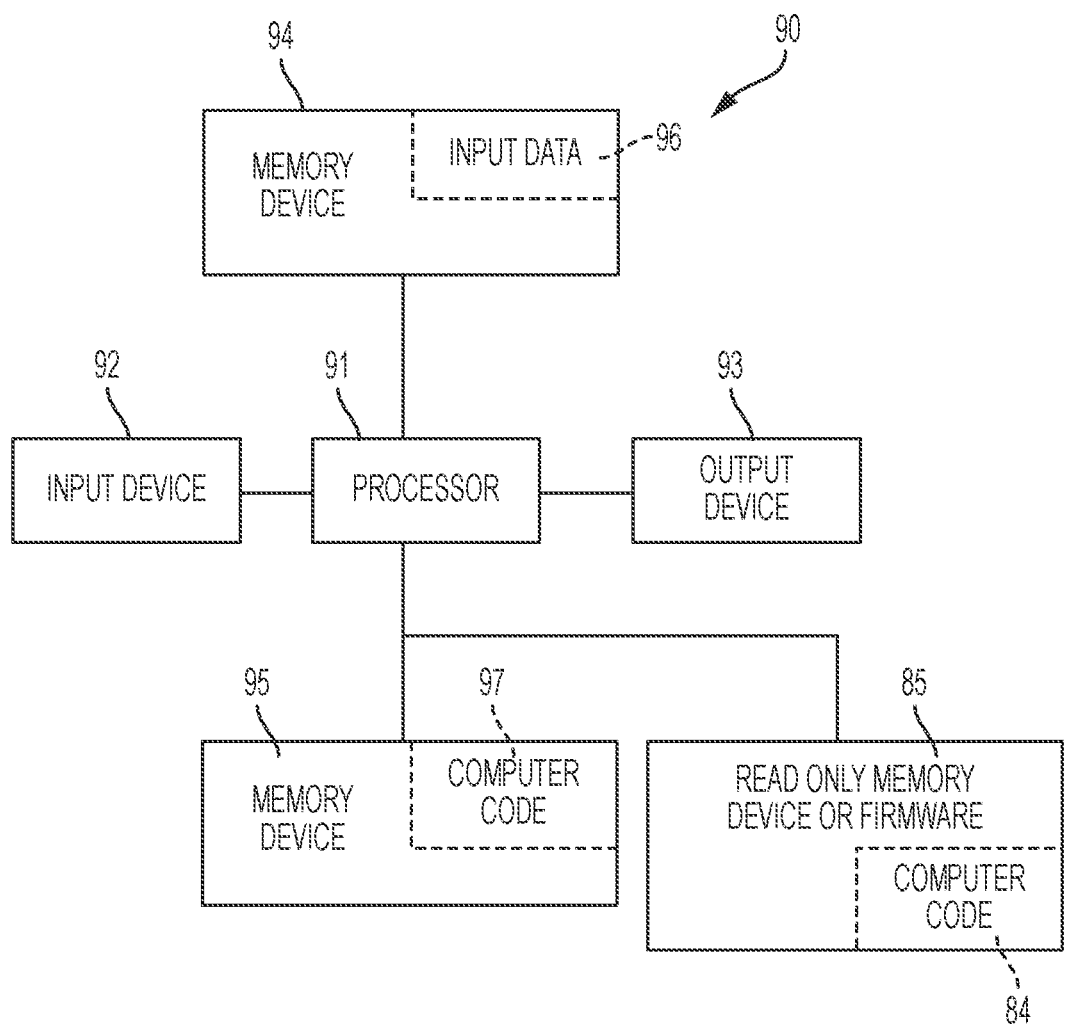
FIG. 4 illustrates a computer system for improving traffic control device technology by determining a status of traffic control devices and redirecting a vehicle based on a determined status of the traffic control devices, in accordance with embodiments of the present invention.

FIG. 4 illustrates a computer system 90 (e.g., server system 25 and computer 14) for improving traffic control device technology by determining a status of traffic control devices and redirecting a vehicle based on a determined status of the traffic control devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving traffic control device technology by determining a status of traffic control devices and redirecting a vehicle based on a determined status of the traffic control devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve traffic control device technology by determining a status of traffic control devices and redirecting a vehicle based on a determined status of the traffic control devices. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for improving traffic control device technology by determining a status of traffic control devices and redirecting a vehicle based on a determined status of the traffic control devices. In another embodiment, the invention provides a business method that performs the process steps of the invention on a subscription, advertising, and/or fee basis. That is, a service supplier, such as a Solution Integrator, could offer to improve traffic control device technology by determining a status of traffic control devices and redirecting a vehicle based on a determined status of the traffic control devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
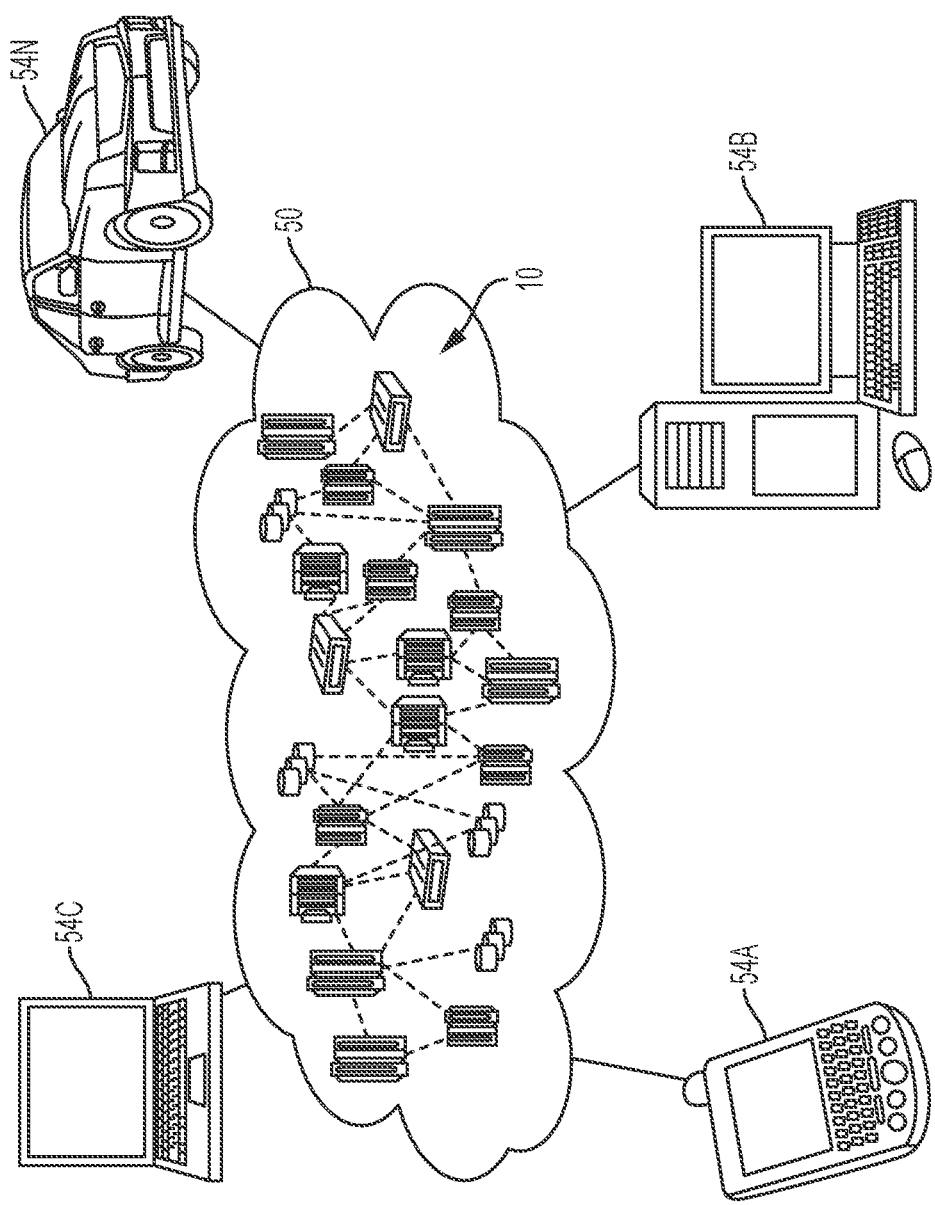
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
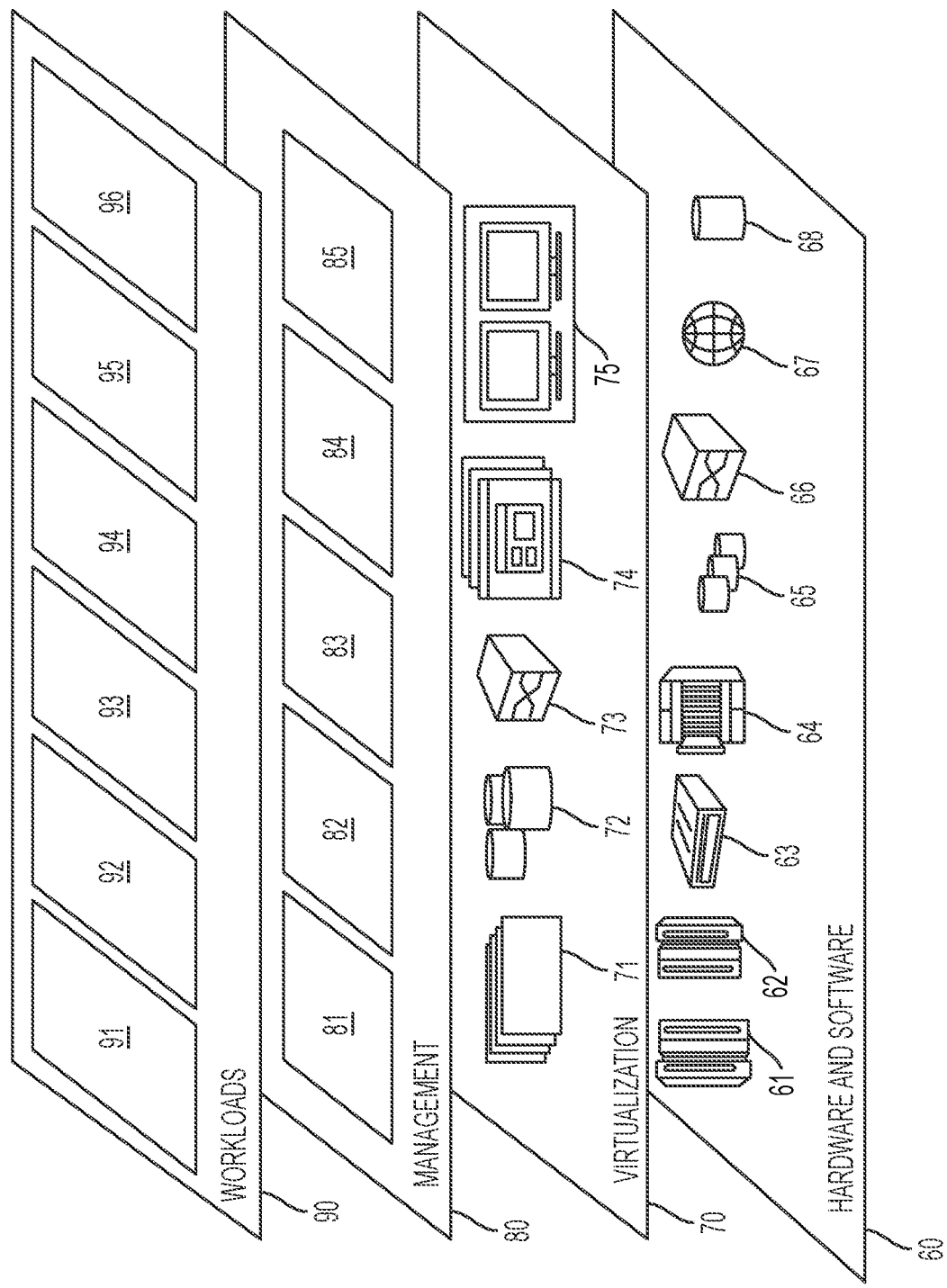
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving traffic control device technology by determining a status of traffic control devices and redirecting a vehicle based on a determined status of the traffic control devices 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated vehicular navigational improvement method comprising:
    continuously monitoring, by a processor of a hardware device within a first vehicle in motion, traffic control devices located within a first specified perimeter surrounding said first vehicle and said traffic control devices, wherein said continuously monitoring comprises:
        transmitting a status request to said traffic control devices; and
        in response to said status request, receiving current operational statuses of said traffic control devices;
    retrieving, by said processor from a remote database, traffic control device data defining operational characteristics of said traffic control devices;
    determining, by said processor, a first distance between said first vehicle and a first traffic control device of said traffic control devices;
    retrieving, by said processor from said first traffic control device, status data indicating a current control status of said first traffic control device;
    retrieving, by said processor, distances and associated travel speeds of a plurality of vehicles located within said first specified perimeter;
    analyzing, by said processor, results of: said continuously monitoring, said current control status, said traffic control device data, said first distance, and said distances and associated travel speeds;
    determining, by said processor based on a current speed of travel of said first vehicle and said first distance of said first vehicle from said first traffic control device, a predicted arrival time of said first vehicle with respect to said first traffic control device;
    determining, by said processor based on results of said analyzing, a predicted control status of said first traffic control device at said predicted arrival time;
    determining, by said processor based on said predicted control status of said first traffic control device and said current operational statuses of said traffic control devices, that at least one traffic control device of said traffic control devices is malfunctioning due to a power outage;
    issuing, by said processor to a driver of said first vehicle based on said predicted control status and said current operational statuses, a control command alert associated with driving functions of said first vehicle;
    detecting, by said processor via said first vehicle, a group of vehicles traveling within a second specified perimeter surrounding said first vehicle;
    receiving, by said processor from an external server, a command for executing control of said first vehicle and said group of vehicles; and
    enabling, by said processor in response to said receiving said command, a switching mechanism of said first vehicle resulting in said external server autonomously controlling functions of said first vehicle and said group of vehicles in accordance with a vehicle speed, distance, and positioning of said first vehicle and said group of vehicles with respect to said at least one traffic control device malfunctioning.

2. The method of claim 1, further comprising:
    transmitting, by said processor to a traffic enforcement agency, a notification indicating that said at least one traffic control device is malfunctioning.

3. The method of claim 2, further comprising:
    generating, by said processor based on said determining that said at least one traffic control device is malfunctioning, an alternative route of travel for redirecting said first vehicle from traveling towards said at least one traffic control device; and
    presenting, by said processor to a driver of said first vehicle, said alternative route of travel.

4. The method of claim 1, further comprising:
    presenting, by said processor to a driver of said first vehicle, said predicted control status of said first traffic control device at said predicted arrival time.

5. The method of claim 1, further comprising:
    determining, by said processor based on detected GPS coordinates of said first vehicle, that said first vehicle has arrived at a location of said first traffic control device;
    automatically deploying, by said processor in response to said determining that said first vehicle has arrived at said location of said first traffic control device, a braking system of said first vehicle.

6. The method of claim 1, further comprising:
    determining, by said processor based on detected GPS coordinates of said first vehicle, that said first vehicle has arrived at a location of said first traffic control device;
    automatically decreasing, by said processor in response to said determining that said first vehicle has arrived at said location of said first traffic control device, a speed of said first vehicle.

7. The method of claim 1, further comprising:
    determining, by said processor based on detected GPS coordinates of said first vehicle, that said first vehicle has arrived at a location of said first traffic control device;
    detecting, by said processor via sensors of said first vehicle, additional vehicles traveling adjacent to said first vehicle;
    generating, by said processor based on results of said detecting, control command alerts associated with driving functions of said additional vehicles; and
    transmitting, by said processor to said additional vehicles, said control command alerts.

8. The method of claim 7, wherein said sensors comprise sensor devices selected from the group consisting of optical sensors, temperature sensors, infrared sensors, speed sensors, GPS sensors, moisture sensors, pressure sensors, motion detector sensors.

9. The method of claim 1, further comprising:
    receiving, by said processor from remote servers, weather related data associated with current weather conditions along a route of travel of said first vehicle, wherein said issuing said control command alert is further based on said weather related data.

10. The method of claim 1, further comprising:

determining, by said processor based on detected GPS coordinates of said first vehicle, that said first vehicle has arrived at a location of said first traffic control device;

detecting, by said processor based on results of detecting via sensors of said first vehicle, additional vehicles traveling towards said first vehicle;

determining by said processor based on results of said detecting, an imminent impact event associated with said first vehicle and said additional vehicles; and automatically deploying, by said processor in response to said determining said imminent impact event, a braking system of said first vehicle.

11. The method of claim 1, wherein said traffic control devices comprise signal devices selected from the group consisting of traffic light signaling devices and railroad crossing signaling devices.

12. The method of claim 1, further comprising:

providing at least one support service for at least one of creating, integrating, hosting, maintaining, and deploying computer-readable code in the computing system, said code being executed by the computer processor to implement: said continuously monitoring, said retrieving said traffic control data, said determining said first distance, said retrieving said status data, said retrieving said distances and associated travel speeds, said analyzing, said determining said predicted arrival time, said determining said predicted control status, and said issuing.

13. A computer program product, comprising a computer readable hardware storage device storing a computer readable program code, said computer readable program code comprising an algorithm that when executed by a computer processor of a hardware device, within a first vehicle in motion, implements an automated vehicular navigational improvement method, said method comprising:

continuously monitoring, by said processor, traffic control devices located within a first specified perimeter surrounding said first vehicle and said traffic control devices, wherein said continuously monitoring comprises:

transmitting a status request to said traffic control devices; and in response to said status request, receiving current operational statuses of said traffic control devices;

retrieving, by said processor from a remote database, traffic control device data defining operational characteristics of said traffic control devices;

determining, by said processor, a first distance between said first vehicle and a first traffic control device of said traffic control devices;

retrieving, by said processor from said first traffic control device, status data indicating a current control status of said first traffic control device;

retrieving, by said processor, distances and associated travel speeds of a plurality of vehicles located within said first specified perimeter;

analyzing, by said processor, results of: said continuously monitoring, said current control status, said traffic control device data, said first distance, and said distances and associated travel speeds;

determining, by said processor based on a current speed of travel of said first vehicle and said first distance of said first vehicle from said first traffic control device, a predicted arrival time of said first vehicle with respect to said first traffic control device;

determining, by said processor based on results of said analyzing, a predicted control status of said first traffic control device at said predicted arrival time;

determining, by said processor based on said predicted control status of said first traffic control device and said current operational statuses of said traffic control devices, that at least one traffic control device of said traffic control devices is malfunctioning due to a power outage;

issuing, by said processor to a driver of said first vehicle based on said predicted control status and said current operational statuses, a control command alert associated with driving functions of said first vehicle;

detecting, by said processor via said first vehicle, a group of vehicles traveling within a second specified perimeter surrounding said first vehicle;

receiving, by said processor from an external server, a command for executing control of said first vehicle and said group of vehicles; and enabling, by said processor in response to said receiving said command, a switching mechanism of said first vehicle resulting in said external server autonomously controlling functions of said first vehicle and said group of vehicles in accordance with a vehicle speed, distance, and positioning of said first vehicle and said group of vehicles with respect to said at least one traffic control device malfunctioning.

14. The computer program product of claim 13, wherein said method further comprises:

transmitting, by said processor to a traffic enforcement agency, a notification indicating that said at least one traffic control device is malfunctioning.

15. The computer program product of claim 14, wherein said method further comprises:

generating, by said processor based on said determining that said at least one traffic control device is malfunctioning, an alternative route of travel for redirecting said first vehicle from traveling towards said at least one traffic control device; and presenting, by said processor to a driver of said first vehicle, said alternative route of travel.

16. The computer program product of claim 13, wherein said method further comprises:

presenting, by said processor to a driver of said first vehicle, said predicted control status of said first traffic control device at said predicted arrival time.

17. The computer program product of claim 13, wherein said method further comprises:

determining, by said processor based on detected GPS coordinates of said first vehicle, that said first vehicle has arrived at a location of said first traffic control device;

automatically deploying, by said processor in response to said determining that said first vehicle has arrived at said location of said first traffic control device, a braking system of said first vehicle.

18. A hardware device, within a first vehicle in motion, comprising a computer processor coupled to a computer-readable memory unit, said memory unit comprising instructions that when executed by the computer processor implements an automated vehicular mode switching improvement method comprising:

continuously monitoring, by said processor, traffic control devices located within a first specified perimeter surrounding said first vehicle and said traffic control devices, wherein said continuously monitoring comprises:

transmitting a status request to said traffic control devices; and in response to said status request, receiving current operational statuses of said traffic control devices;

retrieving, by said processor from a remote database, traffic control device data defining operational characteristics of said traffic control devices;

determining, by said processor, a first distance between said first vehicle and a first traffic control device of said traffic control devices;

retrieving, by said processor from said first traffic control device, status data indicating a current control status of said first traffic control device;

retrieving, by said processor, distances and associated travel speeds of a plurality of vehicles located within said first specified perimeter;

analyzing, by said processor, results of: said continuously monitoring, said current control status, said traffic control device data, said first distance, and said distances and associated travel speeds;

determining, by said processor based on a current speed of travel of said first vehicle and said first distance of said first vehicle from said first traffic control device, a predicted arrival time of said first vehicle with respect to said first traffic control device;

determining, by said processor based on results of said analyzing, a predicted control status of said first traffic control device at said predicted arrival time;

determining, by said processor based on said predicted control status of said first traffic control device and said current operational statuses of said traffic control devices, that at least one traffic control device of said traffic control devices is malfunctioning due to a power outage;

issuing, by said processor to a driver of said first vehicle based on said predicted control status and said current operational statuses, a control command alert associated with driving functions of said first vehicle;

detecting, by said processor via said first vehicle, a group of vehicles traveling within a second specified perimeter surrounding said first vehicle;

receiving, by said processor from an external server, a command for executing control of said first vehicle and said group of vehicles; and enabling, by said processor in response to said receiving said command, a switching mechanism of said first vehicle resulting in said external server autonomously controlling functions of said first vehicle and said group of vehicles in accordance with a vehicle speed, distance, and positioning of said first vehicle and said group of vehicles with respect to said at least one traffic control device malfunctioning.

* * * * *